United States Patent
Son (10) Patent No.: US 9,556,323 B2
(45) Date of Patent: Jan. 31, 2017

(54) INK FOR DISPLAY DEVICE MANUFACTURING AND METHOD FOR MANUFACTURING OF THE SAME, METHOD FOR MANUFACTURING USING THE SAME

(71) Applicant: LG DISPLAY CO., LTD., Seoul (KR)

(72) Inventor: Youngtae Son, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 128 days.

(21) Appl. No.: 14/504,791

(22) Filed: Oct. 2, 2014

(65) Prior Publication Data

US 2015/0132496 A1 May 14, 2015

(30) Foreign Application Priority Data

Nov. 11, 2013 (KR) ........................ 10-2013-0136235

(51) Int. Cl.
| | |
|---|---|
| *C09D 11/36* | (2014.01) |
| *C08K 5/101* | (2006.01) |
| *C08K 5/13* | (2006.01) |
| *C08K 5/01* | (2006.01) |
| *C09D 11/033* | (2014.01) |
| *C09D 11/322* | (2014.01) |
| *C09D 11/38* | (2014.01) |
| *C09D 11/52* | (2014.01) |

(52) U.S. Cl.
CPC ............. *C08K 5/101* (2013.01); *C08K 5/01* (2013.01); *C08K 5/13* (2013.01); *C09D 11/033* (2013.01); *C09D 11/322* (2013.01); *C09D 11/36* (2013.01); *C09D 11/38* (2013.01); *C09D 11/52* (2013.01)

(58) Field of Classification Search
None
See application file for complete search history.

(56) References Cited

U.S. PATENT DOCUMENTS

| | | | | |
|---|---|---|---|---|
| 2005/0156148 A1* | 7/2005 | Kanbe | ................. | H01L 51/0005 252/583 |
| 2008/0007164 A1* | 1/2008 | Suzuki | ................ | H01L 51/5096 313/504 |
| 2008/0265214 A1* | 10/2008 | Steiger | ................ | C09K 11/025 252/500 |
| 2009/0041928 A1* | 2/2009 | Bright | .................... | C09D 11/36 427/58 |
| 2011/0008590 A1* | 1/2011 | Goddard | ............. | H01L 51/0005 428/195.1 |
| 2011/0092015 A1* | 4/2011 | Clough | ............... | H01L 51/0007 438/99 |
| 2011/0269255 A1* | 11/2011 | Goddard | ............. | H01L 51/0007 438/46 |
| 2012/0273736 A1* | 11/2012 | James | ...................... | C09D 5/24 252/519.21 |

FOREIGN PATENT DOCUMENTS

| | | |
|---|---|---|
| CN | 1628493 A | 6/2005 |
| CN | 101222021 A | 7/2008 |
| CN | 101965651 A | 2/2011 |
| CN | 102124588 A | 7/2011 |
| WO | 2005/112145 A1 | 11/2005 |
| WO | WO2012/088194 | * 6/2012 |

* cited by examiner

*Primary Examiner* — Erma Cameron
(74) *Attorney, Agent, or Firm* — Dentons US LLP (57) ABSTRACT

An ink for display device manufacturing, including a solid, a first solvent having a solubility for the solid of 2% or more and a second solvent having a solubility for the solid of 0.5% or less.

3 Claims, 11 Drawing Sheets

(PRECIPITATE SOLID WITH START SOLVENT EVAPORATION)

↓ DRY (SOLVENT SHOULD BE EVAPORATED BY SATURATION REGION TO BE PRECIPITATED SOLID)

| | EXAMPLE 1 | | EXAMPLE 2T | |
|---|---|---|---|---|
| BEFORE/ AFTER DRYING | BEFORE DRYING | AFTER DRYING | BEFORE DRYING | AFTER DRYING |
| |  |  |  |  |

(BEFORE IMPROVEMENT)

FIG. 9B (AFTER IMPROVEMENT)

INK FOR DISPLAY DEVICE MANUFACTURING AND METHOD FOR MANUFACTURING OF THE SAME, METHOD FOR MANUFACTURING USING THE SAME

This application claims the priority benefit of Korean Patent Application No. 10-2013-0136235 filed on Nov. 11, 2013, which is incorporated herein by reference for all purposes as if fully set forth herein.

BACKGROUND

Field of the Invention

The present invention relates to an ink for manufacturing a display device using an inkjet method and a method for manufacturing the display device by using the same.

Discussion of the Related Art

Recently a flat panel display (FPD) has become important in accordance with the development of multimedia. Accordingly, various display devices such as a liquid crystal display (LCD) device, a plasma display panel (PDP), a field emission display (FED) device, an organic light emitting diode (OLED) display, and the like have been put to practical use.

Among the display devices, the organic light emitting diode (OLED) display device is a self-light emitting element that emits light by itself while electron-hole pairs disappear after electrons and holes are paired when the charges are injected into an organic light emitting layer formed between a cathode which is an electron injection electrode and an anode which is a hole injection electrode. In the organic light emitting diode display device it is possible to form the element on a flexible substrate such as a plastic and to drive at a low voltage of 10V or less than the plasma display panel (PDP) and an inorganic light emitting diode display. Therefore, it has the advantages in that the power consumption thereof is relatively small and the color quality is excellent. In addition, the organic light emitting diode display device may represent the three colors red, green, and blue, such that the organic light emitting diode display device is the subject of interest of many people as the next generation display representing rich colors.

In order to secure competitiveness of the organic light emitting diode display device, the manufacturing process needs to be enlarged. An increase in a size of the substrate to be inserted thereon may achieve high productivity and diversification of the products that are produced. To this end, the enlargement of the manufacturing equipment and the development of process technology and materials are needed. In order to increase the area of the substrate in a vacuum deposition process, many improvements are needed in a source of metal or organic matter, a metal mask, a glass substrate and a mask transport system, a construction of the equipment. The organic electro-luminescence element based on low molecular weight is possible to stack in layer by layer deposited through the vacuum deposition process. In order to pattern the R, G, and B sub-pixels, the mask is needed, but the size of a fine metal mask (FMM) increases as the area of the substrate increases, such that the problem of dropping the mask may occur. On the other hand, a solution process is possible to perform the pattern coating over the large area without using the mask through an inkjet printing or a nozzle printing, and utilization of the material of the solution process is very high and about 50 to 80% compared to the vacuum deposition process that utilization of the material is 10% or less. In addition, a glass transition temperature is higher than a thin film obtained by the vacuum deposition process, such that the solution process has thermal stability and excellent morphology characteristics.

Figure 1:
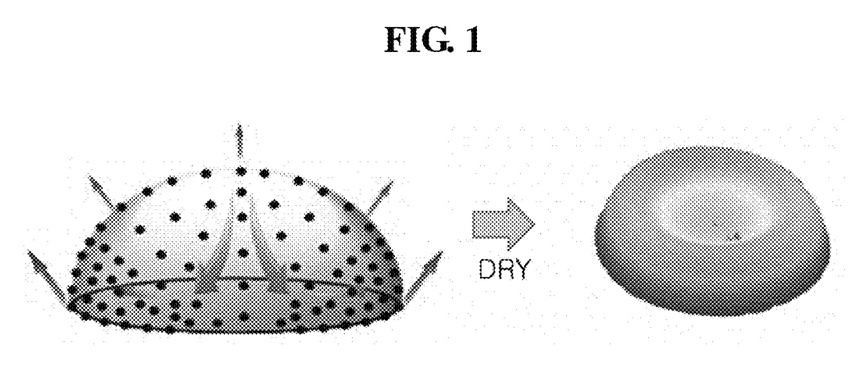
FIG. 1 is a schematic view of a coffee ring phenomenon of an ink.
Figure 2:
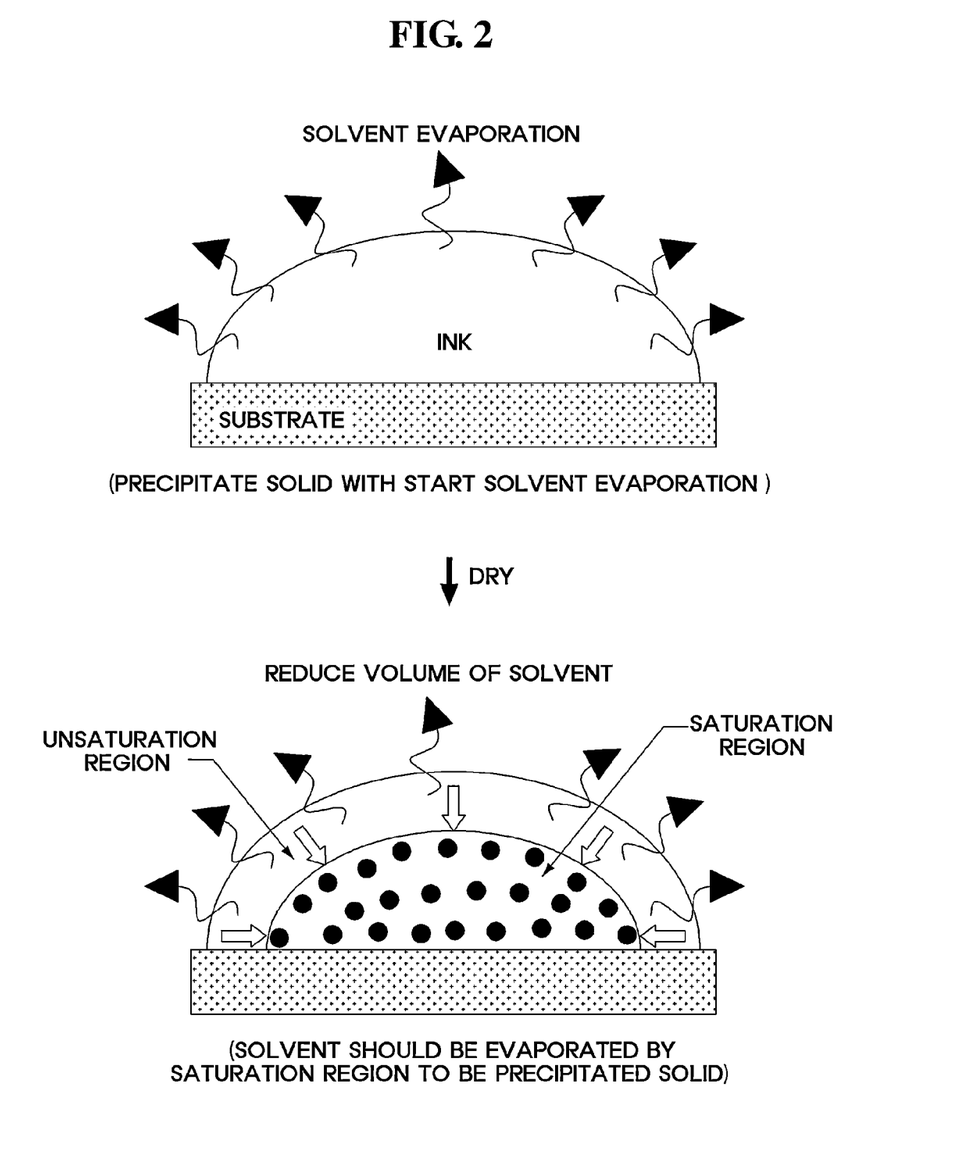
FIG. 2 is a schematic view of an volume decrease phenomenon of an ink.

As a representative method of the above-mentioned solution process, there is a method using the inkjet device. An ink used in the inkjet device is formed by mixing one solvent and a light emitting solid material. However, after the ink drops onto the pixel, a coffee ring and pile-up phenomena occurs during the thinning process according to drying, such that the thickness of the thin film becomes non-uniform and when the light emits, the electric conductivity becomes non-uniform, such that a luminance becomes non-uniform. FIG. 1 is a schematic view of the coffee ring phenomenon of the ink and FIG. 2 is a schematic view of a volume decrease phenomenon of the ink. Referring to FIG. 1, the ink is beginning to dry from the edge portion due to the difference in the evaporation rate of a central portion of the ink drop in which volume per unit area is small and an edge portion which volume per unit area is large. Therefore, the coffee ring phenomenon is caused by a capillary flow phenomenon that the ink flows from the central portion to the edge portion due to the difference in distribution of solids in the central portion and the edge portion according to drying of the ink. In addition, referring to FIG. 2, when drying the dropped ink, the ink dries gradually from the edge portion thereof to the central portion thereof. Here, the volume of the ink gradually decreases due to evaporation as it moves from the edge portion to the central portion. The precipitation of the solids of the ink due to the evaporation of the solvent according to the drying of the ink is carried out from a saturation region section of the solvent. That is, since the solids due to the evaporation at a portion in which the solids are unsaturated are not precipitated, the precipitation of the solids are not uniform according to the saturation of the ink solvent in all sections the ink is spread, such that the thickness of the ink thin film becomes non-uniform.

Therefore, due to the problems that occur during the drying process of the ink as described above, the light-emitting property of the organic light emitting diode display device deteriorates.

SUMMARY

Embodiments of the present invention provides an ink for display device manufacturing and a method for manufacturing a display device using the same capable of implementing a high resolution and improving a light emitting efficiency of the display device while applying to large-area.

Additional advantages and features of embodiments of the invention will be set forth in part in the description which follows and in part will become apparent to those having ordinary skill in the art upon examination of the following or may be learned from practice of embodiments of the invention. These and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided an ink for display device manufacturing, comprising a solid, a first solvent having a solubility for the solid of 2% or more and a second solvent having a solubility for the solid of 0.5% or less.

In other aspect, there is provided a method for manufacturing a display device, comprising manufacturing a solution by mixing after quantifying a first solvent and solids, manufacturing an ink by adding a second solvent to the mixed solution up to a point when the solids are saturated, preparing an inkjet device in which the manufactured ink is mounted, dropping an ink on a substrate on which a plurality of pixels are formed using the inkjet device; and forming an organic film by drying the dropped ink.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

An ink for display device manufacturing according to a first embodiment of the present invention is used to form an organic film of a display device, for example, is used to form the organic film of an organic light emitting diode display device. In particular, the ink for display device manufacturing of the present invention is used in the manufacturing method using an inkjet device among solution processes using an ink.

Described in more detail, the ink for display device manufacturing of the present invention includes solids, a first solvent that solubility for the solids is 2% or more, and a second solvent that the solubility for the solids is 0.5% or less. The solids, which are material forming a thin film, may be a material of at least one of a hole injection layer, a hole transport layer, a light emitting layer, an electron transport layer, and an electron injection layer of the organic light emitting diode display device. For example, in the case in which the solids is the material of the light emitting layer of the organic light emitting diode display device, the solids may consist of at least one or more of host material or dopant material which is light emitting material emitting light of red, greed, or blue color.

The first and second solvents act as a solvent constituting the ink for display device manufacturing. The first and second solvents are made of material having predetermined physical properties to be easily formed by an inkjet device. More specifically, in order to prevent clogging of a nozzle of the inkjet device, the first and second solvents are made of the material having a minimum boiling point (B.P) of 180° C. or more. In addition, in order to correspond to head spec of the inkjet device, the first and second solvents are made of the material having a predetermined viscosity and a predetermined surface tension. For example, the first and second solvents are made of the material having the viscosity of 3 cp or more and the surface tension of 30 dyne/cm or more.

Particularly, the first solvent of the present invention is made of the material hat solubility for the solids is 2% or more and the second solvent thereof is made of the material that the solubility for the solids is 0.5% or less. That is, the first solvent is made of a material that dissolves well the solids and the second solvent is made of a material that does not dissolve well compared to the first solvent. Therefore, the first solvent is made of a material having the boiling point relatively lower than that of the second solvent. Here, the boiling point of the first solvent is 180 to 300° C. and the boiling point of the second solvent is about 30° C. higher than the temperature of the first solvent.

The ink for display device manufacturing of the present invention contains 0.1 to 2 parts by weight of the solids, 50 to 70 parts by weight of the first solvent, and 30 to 40 parts by weight of the second solvent. Here, among the total solvent, the first solvent acts as a main solvent and the second solvent acts as a co-solvent. The first solvent may substantially dissolve the solids as the first solvent and the second solvent may adjust the saturation of the ink solids. That is, the second solvent is added to the first solvent in which the solids are dissolved to form a saturation point when the solids are precipitated in the drying process of the ink.

Figure 3:
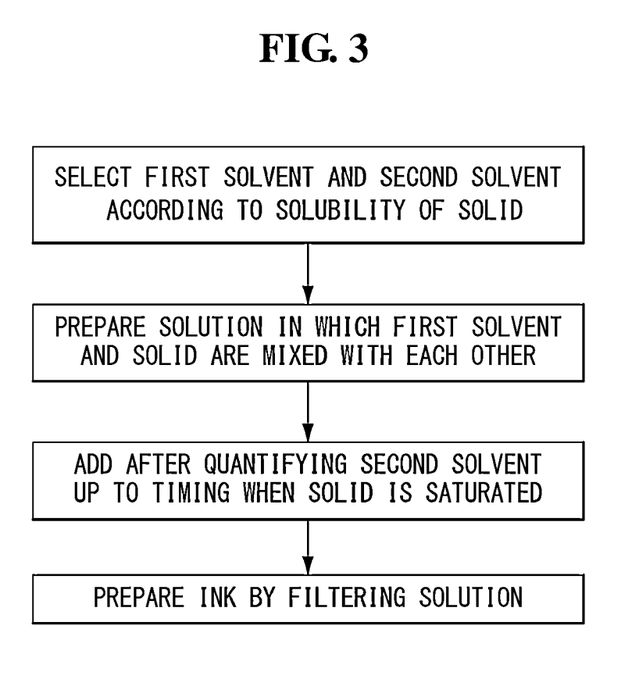
FIG. 3 is a flow chart illustrating a method for manufacturing an ink for display device manufacturing according to a embodiment of the present invention.

A detailed description thereof will be described in a method for manufacturing of the ink for display device manufacturing. FIG. 3 is a flow chart illustrating a method for manufacturing an ink for display device manufacturing according to an embodiment of the present invention.

Referring to FIG. 3, the solids of the thin film to be formed on the display device is prepared. For example, when manufacturing a red light emitting layer of the organic light emitting diode display device, the solids of the red light emitting layer material are prepared. Further, among various solvents relative to the solids, the first and second solvents meeting the conditions of the above-mentioned solvents are selected. In more detail, among the solvents where the boiling point is higher than 180° C. at least, the viscosity is 3 cp or more, and the surface tension is 30 dyne/cm or more, the material that the solids solubility is 2% or more is selected as the first solvent and the material that the solids solubility is 0.5% or less is selected as the second solvent.

When the solids, the first solvent, and the second solvent are selected, after quantifying the solids and the first solvent, a solution is prepared by mixing with each other. after confirming the quantification of the second solvent up to the point when the solids is saturated while gradually adding the selected second solvent to the prepared solution, the weight ratio of the first solvent and the second solvent of the solids is determined. That is, after confirming the saturation point of the solution by adding the second solvent until the solids are precipitated, the weight ration of the second solvent is determined. In this case, in order to correct the physical property of the prepared solution, for example, the viscosity and the surface tension, other solvent may be additionally added. Here, the solvent which may be added is similar to the physical property of the second solvent described above and the other materials are used only the physical property to be corrected.

Next, other impurities and foreign material are removed by filtering the solution that the physical property is corrected, thereby making it possible to manufacture the ink for display device manufacturing of the present invention. The ink for display device manufacturing that is manufactured may indicate the following two effects.

Figure 4:
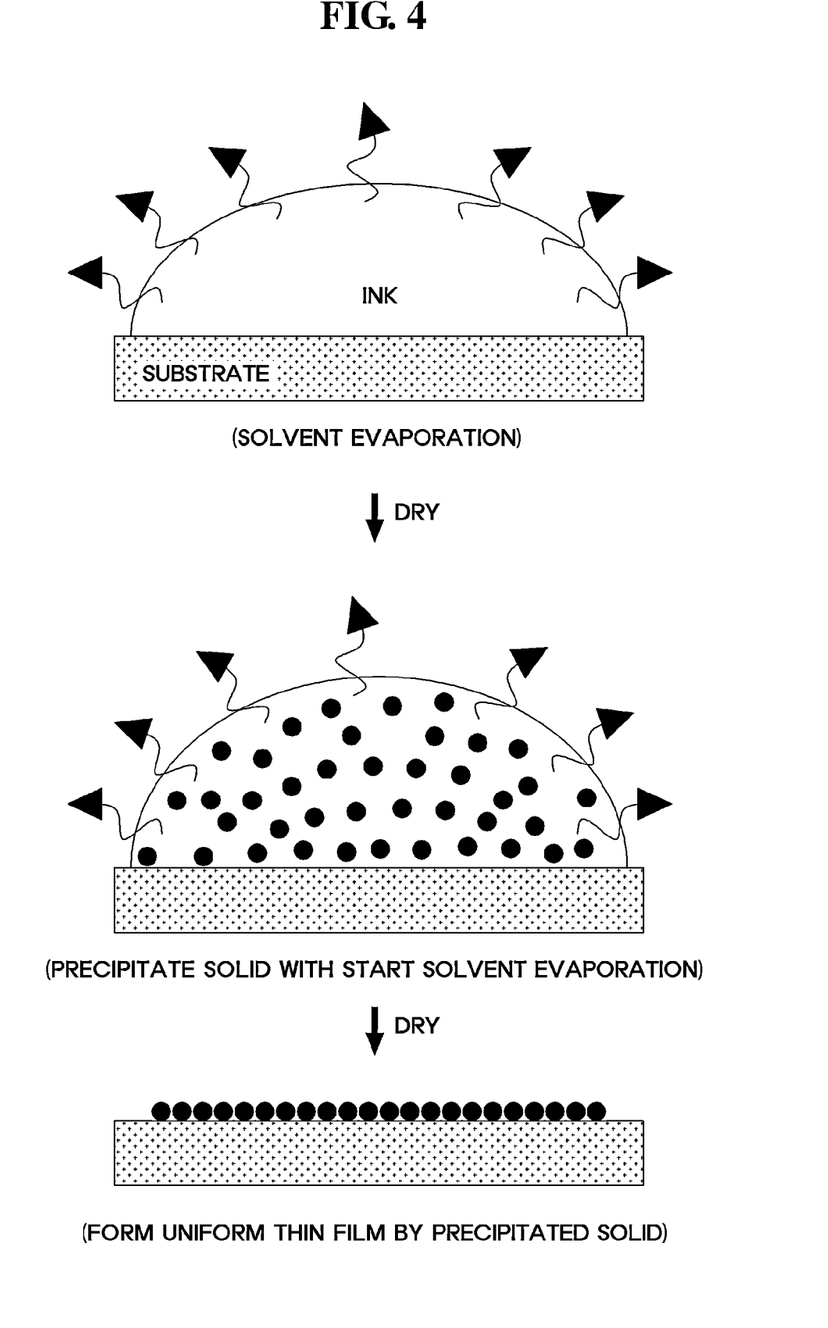
FIGS. 4 and 5 are views schematizing a drying process of an ink for display device manufacturing according to a embodiment of the present invention.
Figure 5:
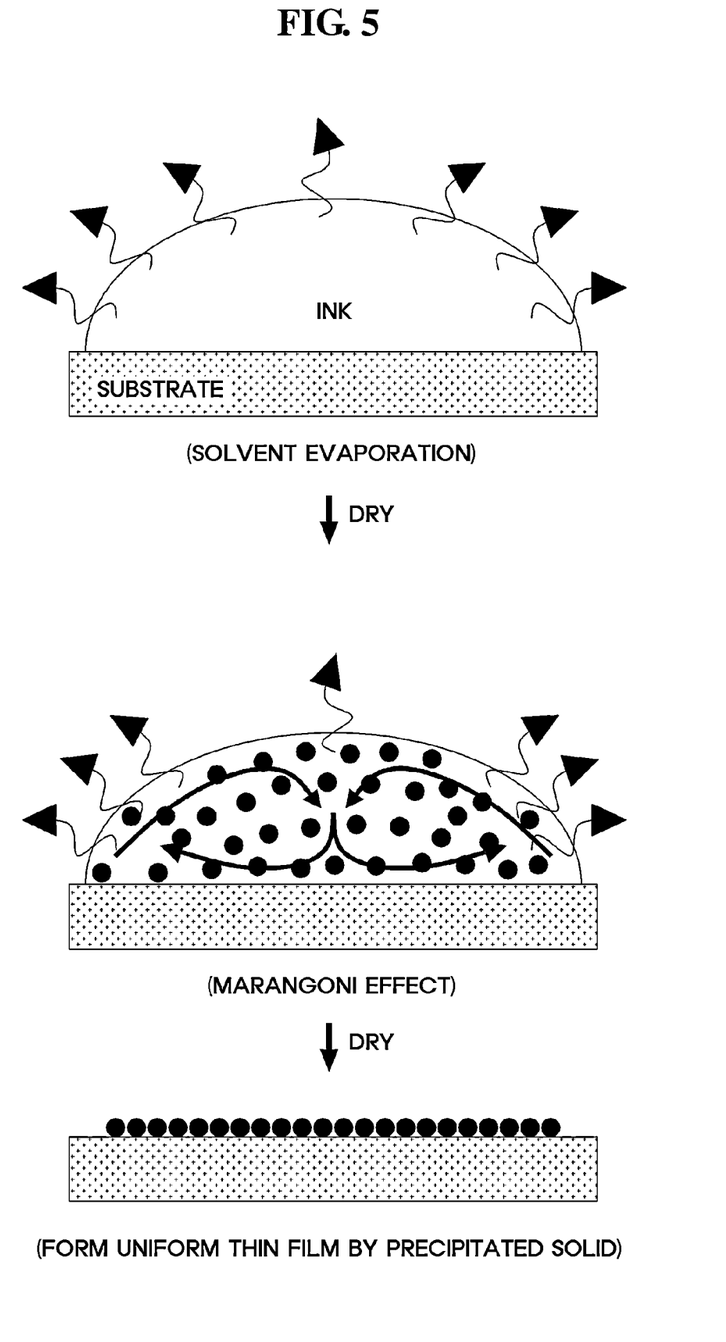

FIGS. 4 and 5 are views schematizing a drying process of an ink for display device manufacturing of the present invention.

Referring to FIG. 4, the ink for display device manufacturing of the present invention includes the solids, the first solvent, and the second solvent. After the ink is dropped on the substrate, it is dried, such that the first solvent and the second solvent constituting the ink starts to evaporate. At the same time, the solids are precipitated. As described above, since the saturation of the ink was adjusted using the second solvent, the solids are precipitated simultaneously with the evaporation of the first and second solvents. Therefore, the thin film that the solids are uniformly stacked may be formed on the substrate.

In the case of the ink according to the related art as illustrated in FIG. 2, even if the solvent starts to evaporate after drying the ink, since the ink is an unsaturated state, the solvent is continuously evaporated until the saturation state is reached, such that the volume of the solvent is decreased. However, as described above, since the solvent of the ink is evaporated and at the same time, the solids are precipitated, there is an advantage that a uniform thin film may be formed.

In addition, referring to FIG. 5, the ink for display device manufacturing of the present invention consists of the second solvent having the boiling point higher 30° C. or more than the first solvent. After the ink is dropped on the substrate, when it is dried, the first solvent having the relatively low boiling point is evaporated. In particular, since the evaporation rate from an edge portion is higher than a central portion of the ink, amount of evaporation of the first solvent from the edge portion increases. In the case of the ink according to the related art as illustrated in FIG. 1, since the distribution of the solid particles due to the evaporation from the edge portion is increased at the edge portion, a capillary flow phenomenon occurs to the edge portion from the central portion of the ink, such that coffee ring and pile-up phenomena have occurred. However, in the case of the ink according to the present invention, marangoni effect increases due to the second solvent that the boiling point is high, such that the second solvent may prevent that the coffee ring and pile-up phenomena occur to the central portion from the edge portion by convention current of the ink inside.

Hereinafter, the method for manufacturing the display device using the ink for display device manufacturing of the present invention will be described below. FIGS. 6A to 6D are views illustrating a method for manufacturing a display device for each process according to an embodiment of the present invention. In the embodiment of the present invention, the organic light emitting diode display device will be described as the example of the display device.

Figure 6A:
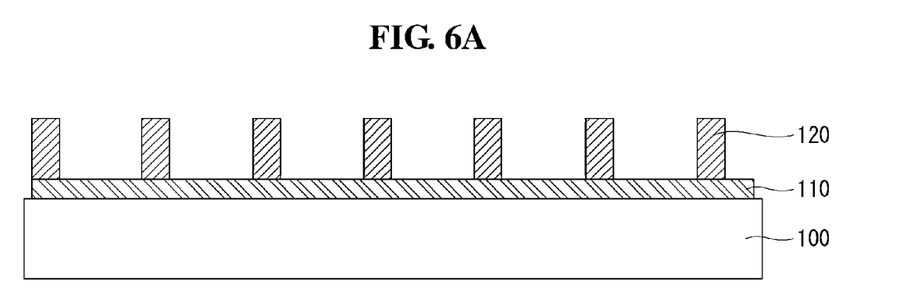
FIGS. 6A to 6D are views illustrating a method for manufacturing a display device for each process according to an embodiment of the present invention.

Referring to FIG. 6A, a first electrode 110 is formed on the substrate 100. The substrate 100 may be made of glass, plastic, or metal and may include a plurality of thin film transistors. The first electrode 110, which is an anode electrode, may be made of a transparent material such as indium tin oxide (ITO), indium zinc oxide (IZO), zinc oxide (ZnO), or the like. Although not shown, the first electrode 110 may be electrically connected to the thin film transistor described above.

A bank layer 120 is formed on the first electrode 110. The bank layer 120 defines a region in which organic films including a light emitting layer are formed by defining a plurality of pixels. The bank layer 120 may be formed of an organic material such as acrylic-based resin, polyimide-based resin, benzocyclobutene BCB, or the like and an inorganic film such as silicon oxide (SiO2), silicon nitride SiNx, silicate on glass (SOG), or the like.

Figure 6B:
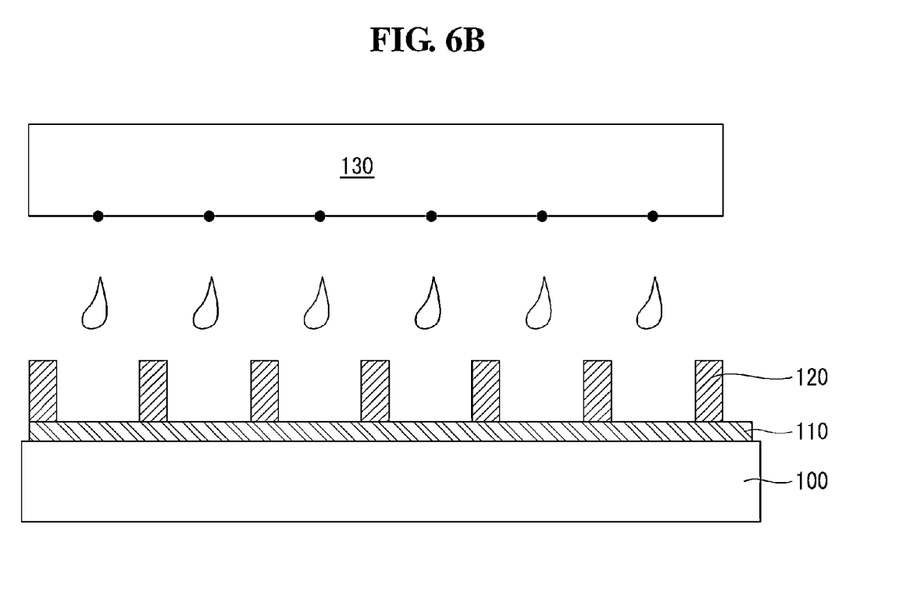
Figure 6C:
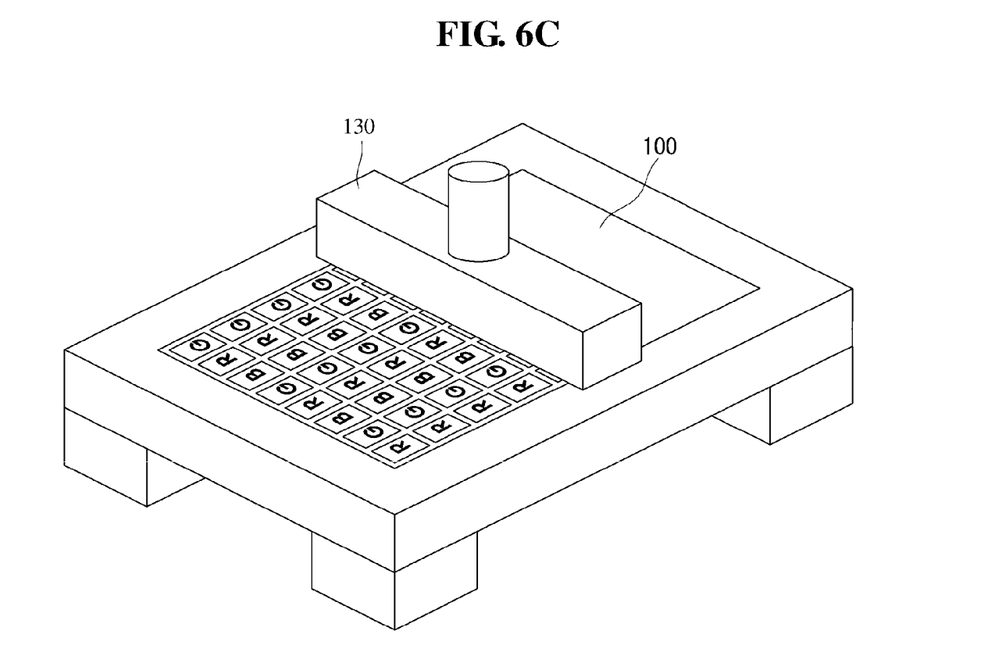

Referring to FIGS. 6B and 6C, an inkjet device 130 is aligned on the substrate 100 on which the bank layer 120 is formed. The inkjet device 130 includes the ink of the present invention described above, for example, the ink of red, green, and blue colors. Each discharge port provided in the inkjet device 130 is disposed to correspond to each pixel of which is divided into the bank layer 120 of the substrate 100. The inkjet device 130 is driven to print the ink on the substrate 100. The inks discharged from the discharge port of the inkjet device 130 are dropped to the each pixel. As illustrated in FIG. 6C, the red ink is dropped to the red pixel R, the green ink is dropped to the green pixel G, and the blue ink is dropped to the blue pixel B.

Figure 6D:
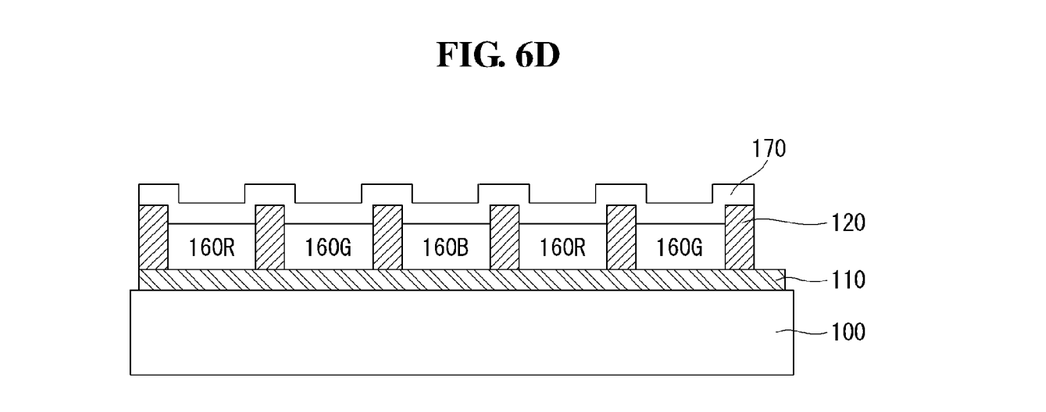

Referring to FIG. 6D, the solvent of the ink dropped onto each pixel is removed by drying the substrate 100 in which the ink is dropped, and the like. Therefore, a red light emitting layer 160R, a green light emitting layer 160G, and a blue light emitting layer 160b are formed in each pixel, which is divided into the bank layer 120 on the substrate 100. Next, a second electrode 170 is formed by stacking the metal such as aluminum (Al), silver (Ag), magnesium (Mg), and the like on the substrate 100 on which the light emitting layers 160R, 160G, and 160B are formed, such that the organic light emitting diode display device of the present invention is prepared.

Hereinafter, in order to assist in understanding of the present invention, the embodiments are disclosed. However, the following examples are illustrative of the present invention, but the present invention is not limited to the following examples.

Select Solvent of Ink

After selecting iridium compound as the solids of the ink, in order to select the solvent, the solubility of the solvent in seven with respect to the iridium compound is measured. The measurement result was shown in the following Table 1. As an evaluation method, after the solids and each solvent were mixed with 1 wt %, a degree of dissolution under the conditions of A to C below is determined. The determination result were displayed O (dissolved) and X (does not dissolve).

A: measure after neglecting the mixture at room temperature for 24 hours.

B: after A, measure after neglecting the mixture at room temperature for 24 hours and eating for 10 minutes at 150° C.

C: after B, measure after neglecting at room temperature for 24 hours and after storage in cold storage for 24 hours at 4° C.

TABLE 1

| Condition/Solvent | Dodecyl benzene | Cyclohexyl benzene | Tetralin | Butyl benzene | Octyl octanate | 4-Methyl anisole | 3-Phenoxy toluene |
|---|---|---|---|---|---|---|---|
| A | X | X | O | X | X | O | X |
| B | X | O | O | O | X | O | O |
| C | X | O | O | O | X | O | O |

Referring to Table 1, tetralin, 4-methyl anisole, and the like have been shown as the solvent that dissolves well the iridium compound solids, and dodecyl benzene, octyl octanoate, and the like have been shown as the solvent that does not dissolve well the iridium compound solids. Therefore, 4-methyl anisole and 3-phenoxy toluene are selected as the first solvent that dissolves well the solids and cyclohexyl benzene and octyl octanoate are selected as the second solvent that does not dissolve well the solids. In addition, in order to adjust the property of the ink, dimethylphthalate was selected as a third solvent.

The embodiment of the ink for display device manufacturing is disclosed using the solids and the selected solvents.

Example 1

The solvent was prepared by mixing the 4-methyl anisole as the first solvent, cyclohexyl benzene as the second solvent, and dimethylphthalate as the third solvent in a ratio of 3:5:2 and the iridium compound as the solids was prepared by mixing with 1 wt %.

Comparative Example 1

Under the same condition as the example 1 described above, the ink was prepared in the same way, except that 3-phenoxy toluene is used as the first solvent and octyl octanoate is used as the second solvent is prepared.

Figure 7:
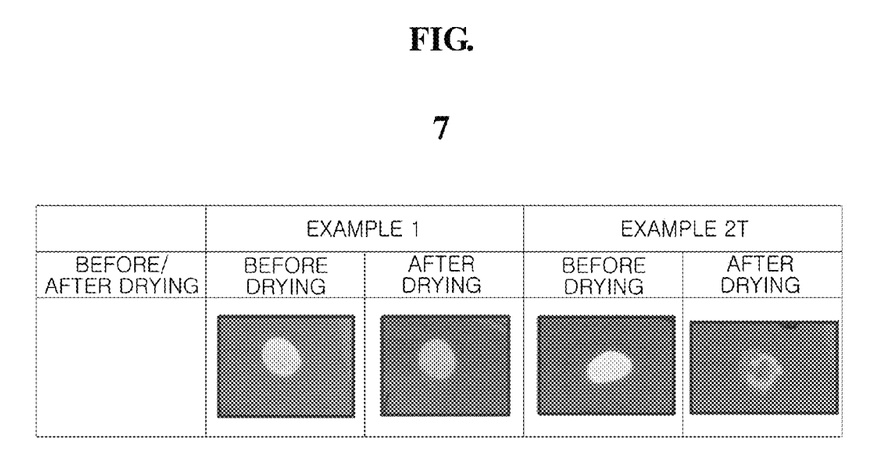
FIG. 7 illustrates images before and after drying after dropping an ink that is manufactured according to an example 1 and a comparative example 1.

After dropping the ink of 0.1 cc that is manufactured on the ITO substrate according to the example 1 and comparative example 1, the images before and after the ink is dried on a hot plate at 120° C. were measured and the results are represented in FIG. 7. Referring to FIG. 7, the case of the ink manufactured according to the example 1, the solids are uniformly spread even after drying, and the case of the ink manufactured according to the comparative example 1, the coffee-ring phenomenon that the solids are spread to the edge occurs even after drying.

Hereinafter, discloses an example observing the luminescent properties and the uniformity of the thin film by manufacturing the organic light emitting diode display device using the ink according to example 1 and comparative example 1 described above.

Example 2

A hole injection layer (HIL), a hole transport layer (HTL), and a light emitting layer (EML) are formed on the ITO substrate using the ink manufactured according to the example 1 described above. The light emitting layer is formed by the red light emitting layer (EML-R) and the green light emitting layer (EML-G). The organic light emitting diode display device was prepared by forming an electron transport layer (ETL), an electron injection layer (EIL), and an anode using an evaporation method.

Comparative Example 2

Under the same condition as the example 2 described above, the organic light emitting diode display device was prepared in the same way, except that the ink manufactured according to comparative example 1 is used.

Figure 8A:
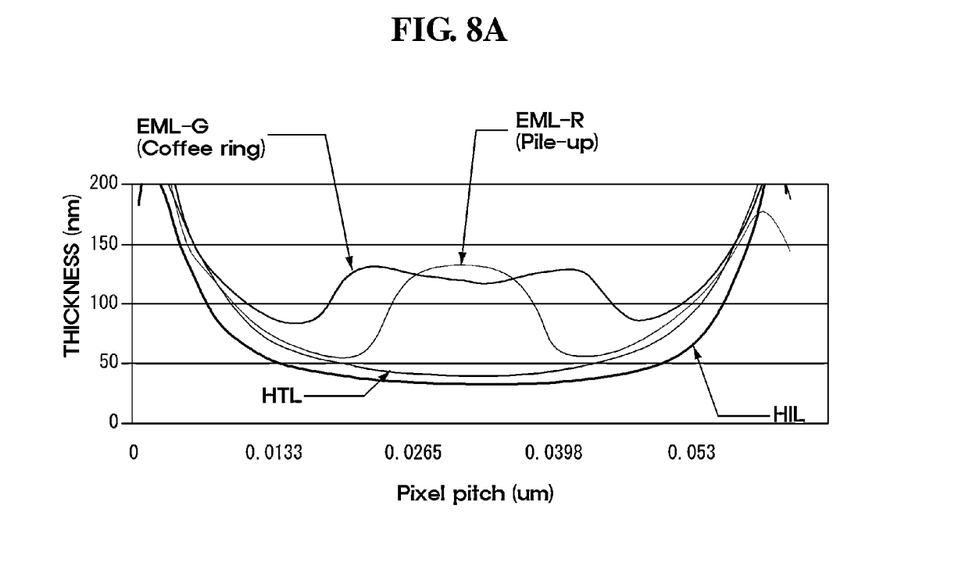
FIG. 8A is a graph illustrating a cross-section profile of a red pixel and a green pixel of a comparative example 2.
Figure 8B:
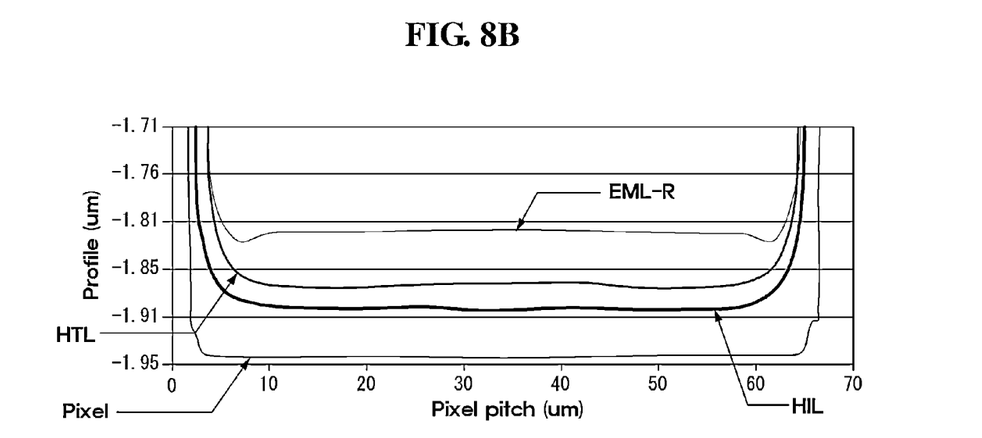
FIG. 8B is a graph illustrating a cross-section profile of a red pixel of an example 2.
Figure 8C:
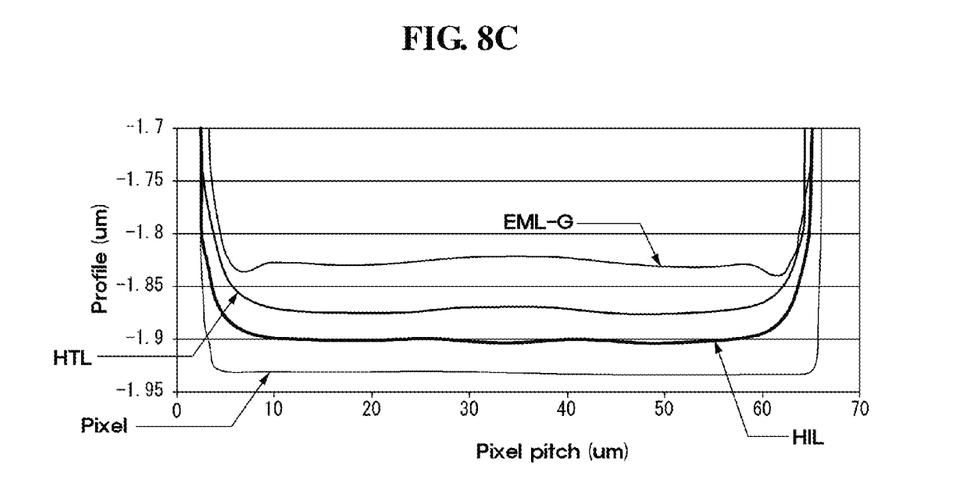
FIG. 8C is a graph illustrating a cross-section profile of a green pixel of an example 2.

Then, the cross-sectional profile and the lighting image of the red pixel and the green pixel of the organic light emitting diode display device prepared according to the example 2 and the comparative example 2 described above were measured. FIG. 8A is a graph illustrating the cross-section profile of the red pixel and the green pixel of a comparative example 2, FIG. 8B is a graph illustrating the cross-section profile of the red pixel of the example 2, and FIG. 8C is a graph illustrating the cross-section profile of the green pixel of the example 2. In addition, FIG. 9A is a lighting image of the red and green pixels manufactured according to the comparative example 2 and FIG. 9B is a lighting image of the red and green pixels manufactured according to the example 2.

Referring to FIG. 8A, the pile up phenomenon that the center of the red light emitting layer rises has occurred in the red and green pixels prepared according to the comparative example 2, and the coffee-ring phenomenon has occurred in the green light emitting layer. On the other hand, referring to FIGS. 8B and 8C, both the red light emitting layer and the green light emitting layer were formed to have a uniform thickness in the red and green pixels prepared according to the example 2.

Figure 9A:
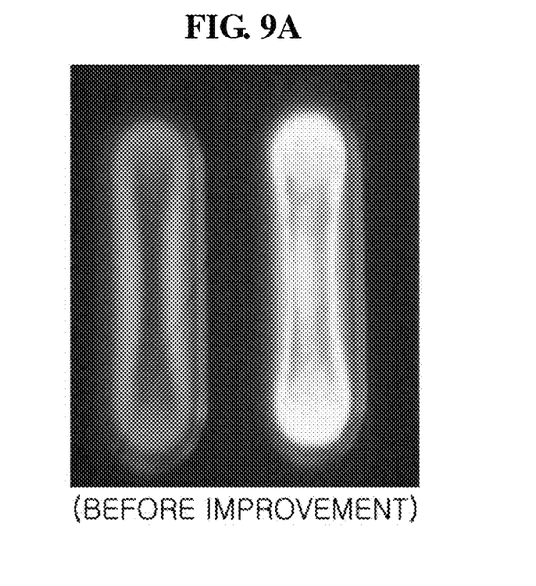
FIG. 9A is a light emitting image of a red and green pixels manufactured according to a comparative example 2 and FIG. 9B is a light emitting image of a red and green pixels manufactured according of an example 2.
Figure 9B:
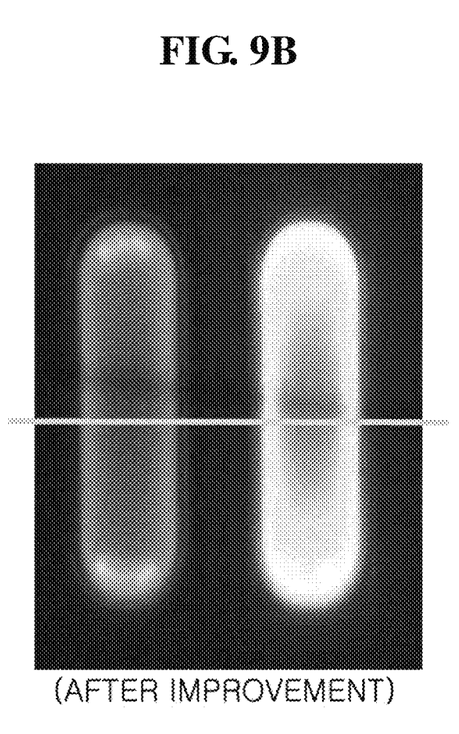

In addition, referring to FIG. 9A, the red pixel and the green pixel manufactured according to the comparative example 2 are turned on. As a result, a width of a central portion of each pixel is narrowed to non-uniformly emit the light. On the other hand, referring to FIG. 9B, when the red pixel and the green pixel manufactured according to the example 2 are turned on, a width of each pixel is not narrowed to uniformly emit the light.

As described above, according to the ink for display device manufacturing and the method for manufacturing the display device using the same, It is possible to form a uniform light-emitting layer to adjust the saturation and the solvent of the ink and to improve the emission properties.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An ink for display device manufacturing, comprising:
   a solid comprising at least one or more of a host material or a dopant material which is a light emitting material;
   a first solvent, which is 4-methyl anisole; and
   a second solvent, which is cyclohexyl benzene; and wherein the ink comprises 0.1 to 2 parts by weight of the solid, 50 to 70 parts by weight of the first solvent, and 30 to 40 parts by weight of the second solvent.

2. The ink for display device manufacturing of claim 1, wherein the ink further comprises a third solvent.

3. The ink for display device manufacturing of claim 2, wherein the third solvent is dimethylphthalate.

* * * * *